March 9, 1926.  1,576,115

E. H. GOLD ET AL

HOSE COUPLING

Original Filed May 1, 1922

Inventors
Egbert H. Gold
Edward A. Russell
By Barnett & Truman
Attorneys

Patented Mar. 9, 1926.

1,576,115

UNITED STATES PATENT OFFICE.

EGBERT H. GOLD AND EDWARD A. RUSSELL, OF CHICAGO, ILLINOIS; SAID RUSSELL ASSIGNOR OF ONE-HALF OF THE ENTIRE RIGHT TO VAPOR CAR HEATING COMPANY, INC., OF CHICAGO, ILLINOIS, A NEW YORK CORPORATION.

HOSE COUPLING.

Original application filed May 1, 1922, Serial No. 557,675. Divided and this application filed May 29, 1924. Serial No. 716,602.

*To all whom it may concern:*

Be it known that we, EGBERT H. GOLD and EDWARD A. RUSSELL, citizens of the United States, residing at Chicago, in the county of Cook and State of Illinois, have invented certain new and useful Improvements in Hose Couplings, of which the following is a specification.

Our invention relates to a hose coupling for connecting the rubber hose, or equivalent flexible conduit members on the train pipes of the adjacent cars of a railway train or for use in connecting pipe or hoses in other similar situations; the invention being concerned particularly with the type of coupling in which one or each of the mating couplers comprises a conduit member, preferably provided with a gasket to bear against a corresponding part of the mating coupler, a coupling member through which the conduit member extends adapted to interlock with the mating coupler, and means for effecting a relative movement between said conduit and coupling members which makes effectual the interlock of one coupler with the other and forces the conduit member into close contact with the conduit member of the other coupler.

The principal object of the invention is to provide a new and improved coupler of the type indicated which will be simple in its construction, economical to manufacture, of compact structure, and light in weight while providing effective means for insuring a reliable interlock between the coupler and its mate.

This application is a division of my co-pending application Serial No. 557,675, filed May 1, 1922, which has matured into Patent No. 1,510,000 dated Sept. 30, 1924.

Figure 2:
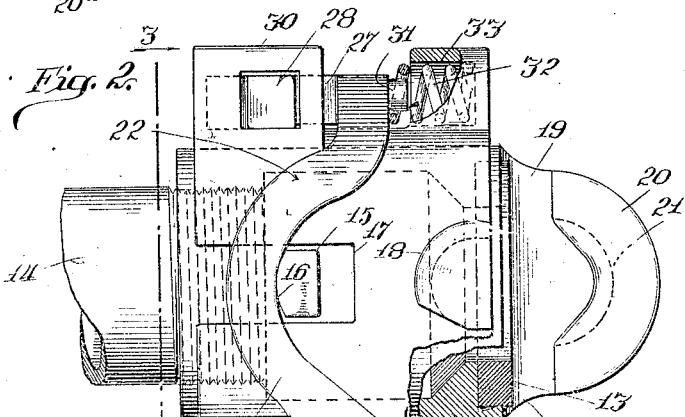
Figure 3:
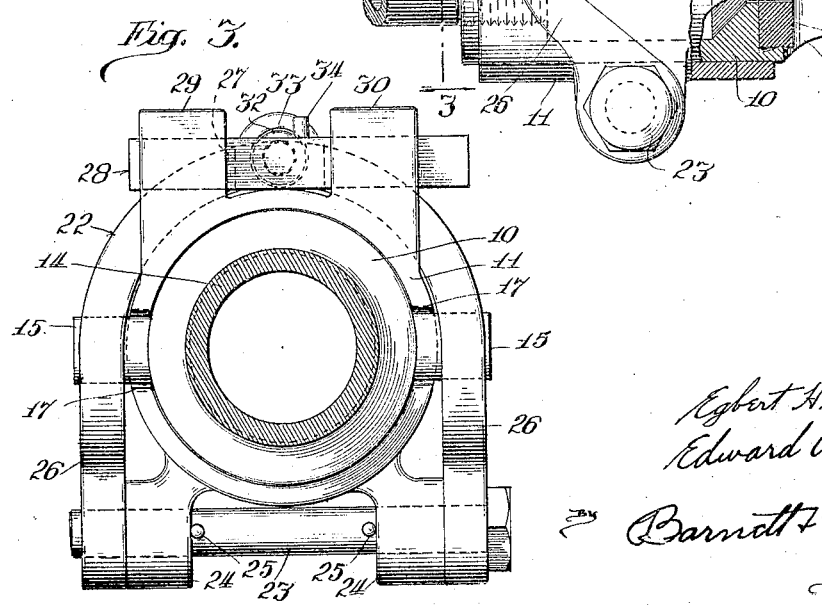

In describing the invention it will be assumed that both members of the coupling, that is, both couplers, are of the same construction. It will be obvious, however, that identity of structural design throughout is not essential so long as such coupler is so constructed as to mate with the other. The invention is illustrated in the accompanying drawing, wherein Fig. 1 is a plan view, with parts in section, of a pair of interlocked couplers made in accordance with the principles of our invention, Fig. 2 is a side elevation of one of the couplers shown in Fig. 1, the lower portion of this figure being shown in section, and Fig. 3 is a rear end view of the coupler shown in Fig. 2, being taken on line 3—3 of Fig. 2.

Figure 1:
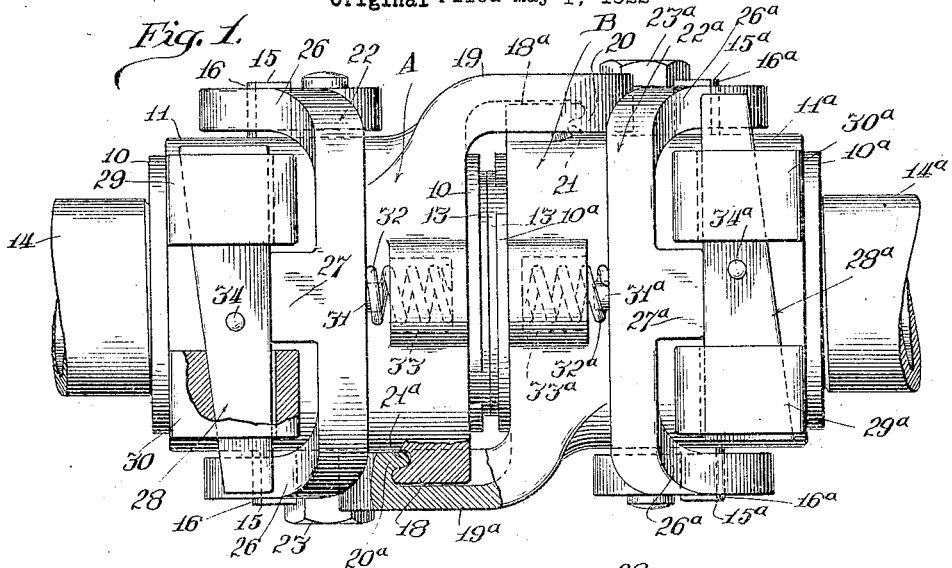

The coupling illustrated in Fig. 1 of the drawing is made up of two interlocked couplers A and B which are preferably, though not necessarily, identical in construction. It will, therefore, be sufficient for a clear understanding of the invention to describe the coupler A in detail, the corresponding parts of coupler B being given the same reference numerals distinguished by the exponent $a$. The coupler A consists of a conduit or gasket holding member 10 and a coupling member 11 which is longitudinally slidable, and to a limited extent rotatable, on the conduit member. The forward end of the conduit member is formed with a recess 12 to provide a seat for a gasket 13 and is provided at its other end with a nipple or union 14 for connection with a rubber hose or other tubular structure. The outer surface of the conduit member is provided with diametrically arranged outstanding projections 15, the rear faces of which are curved as indicated at 16.

The coupling member 11 is provided with slots 17 through which the projections 15 of the conduit member extend, the slots being preferably somewhat wider than the projections so as to permit a rotational movement of the coupling member with relation to the conduit member. The coupling member 11 is provided on one side with an undercut lug 18 and on the opposite side with a forwardly projecting wing or arm 19 provided at its outer end with a lug 20 formed with an undercut recess 21. The lug 20 interlocks with a lug $18^a$ on the coupler B and the lug 18 of coupler A is engaged by the locking lug $20^a$ on the arm $19^a$ of coupler B. 22 is a substantially U-shaped yoke, the ends of which are pivoted by means of a bolt 23 to ears 24 formed on the bottom of the coupling member 11, the bolt being held in place by studs 25, 25. The legs 26 of the yoke 22 are preferably curved and engage the curved surfaces 16 of the projections 15 on the conduit member. The top portion of the yoke is formed with a projecting pad 27 against which is adapted to bear a wedge 28 mounted to slide laterally of the coupling in projections 29, 30 on the top of the coupling member. Yoke 22 is formed opposite pad 27 with a stud 31 to center against the yoke a coiled spring 32 arranged in a spring pocket 33. The wedge 28 is formed with a retaining stud 34.

The interlocking of the couplers is effected by releasing the pressure of the wedges 28, 28ᵃ on the yoke members, whereupon the springs 32, 32ᵃ move the yoke members rearwardly so as to release the pressure of the yokes on the projections 15, 15ᵃ. The coupling members 11, 11ᵃ may then be moved longitudinally of their associated conduit members to permit the lugs 20, 20ᵃ of the arms 19, 19ᵃ to be brought into preliminary engagement with the lugs 18, 18ᵃ by a lateral movement of the couplers A and B. This preliminary engagement holds the conduit members 10, 10ᵃ in horizontal alignment. The wedges may then be driven in the direction of their smaller end to force the yokes 22, 22ᵃ forward, thereby causing the conduit members to be forced tightly against each other. The pressure exerted between the conduit members reacts upon the coupling members to tighten the interlocking engagement between said members.

We claim:

1. In a hose coupler, the combination of a conduit member formed with a pair of diametrically arranged outstanding projections, a coupling member through which the conduit member extends and which is slotted for said projections, means on the coupling member for interlocking the same with a mating coupler, a yoke pivoted to said coupling member and adapted to bear against the projections on the conduit member, and a wedge adapted to be driven against said yoke so that the conduit member is moved forwardly through the coupling member.

2. In a hose coupling, the combination of a conduit member, a coupling member movably arranged on said conduit member and adapted to interlock with a mating coupler, and means engaging said conduit member, and pivoted to said coupling member so as to be movable longitudinally thereof to force said conduit member against the mating coupler.

3. In a hose coupling, the combination of a conduit member, a coupling member movably arranged on said conduit member and adapted to interlock with a mating coupler and means engaging said conduit member and pivoted to said coupling member so as to be movable longitudinally thereof for tightening the engagement of the coupling member and the mating coupler and forcing the conduit member against the corresponding part of the mating coupler.

4. In a hose coupling, the combination of a conduit member, a coupling member slidable longitudinally of the conduit member and adapted to interlock with a mating coupler, and a member pivoted to move about an axis extending transversely of the coupling and adapted to engage said conduit member to force it against a corresponding part of a mating coupler.

5. In a hose coupling, the combination of a conduit member, a coupling member movably supported on said conduit member and adapted to interlock with a mating coupler, and an arm embracing said coupling member and pivoted to move longitudinally of the coupling member for tightening the interlocking engagement.

6. In a hose coupling, the combination of a conduit member, a coupling member having a lug adapted to interlock with a mating coupler, said coupling member being movably arranged on said conduit member, and pivoted means embracing said coupling member and engaging said conduit member for tightening the interlocking engagement of said lug with the mating coupler and for forcing said conduit member against the corresponding part of said mating coupler 7. In a hose coupler, the combination of a conduit member, a coupling member formed on one side with a lug and on the other side with a forwardly projecting arm adapted to interlock with a mating coupler, said coupling member being movably arranged on said conduit member and means pivoted to said coupling member and engaging said conduit member for tightening the interlocking engagement of said lug and arm with the mating coupler and for forcing said conduit member against a corresponding part of said mating coupler.

8. In a hose coupler, the combination with a conduit member, a coupling member formed on one side with an undercut lug and on the other side with a forwardly projecting arm adapted to interlock with corresponding parts of a mating coupler, said coupling member being movably arranged on said conduit member, and a yoke member engaging said conduit member and movable longitudinally of the coupling member for tightening the interlocking engagement of the coupling member with the mating coupler.

9. In a hose coupler, the combination with a conduit member, a coupling member formed on one side with an undercut lug and on the other side with a forwardly projecting arm adapted to interlock with corresponding parts of a mating coupler, said coupling member being movably arranged on said conduit member, and a yoke member engaging said conduit member and movable longitudinally of the coupling member for tightening the interlocking engagement of said coupling member with a mating coupler and for forcing said conduit member against the corresponding part of said mating coupler.

10. In a hose coupler, the combination with a conduit member, a coupling member movably arranged on said conduit member and adapted to interlock with a mating coupler, and means for tightening said interlocking engagement comprising a member pivoted to said coupling member and a wedge for exerting pressure against said pivoted member.

11. In a hose coupler, the combination with a conduit member, a coupling member movably arranged on said conduit member and adapted to interlock with a mating coupler, and means for tightening said interlocking engagement comprising a member pivoted to said coupling member to move longitudinally thereof and a wedge for exerting pressure against said pivoted member.

12. In a hose coupler, the combination with a conduit member, a coupling member movably arranged on said conduit member and adapted to interlock with a mating coupler, and means for tightening said interlocking engagement comprising a member pivoted to said coupling member and a wedge movable transversely of the link of said coupling member for exerting pressure against said pivoted member.

13. In a hose coupler, the combination with a conduit member, a coupling member movably arranged on said conduit member and adapted to interlock with a mating coupler, and means for tightening said interlocking engagement comprising a yoke member pivoted to said coupling member and a wedge for exerting pressure against said yoke.

14. In a hose coupler, the combination with a conduit member, a coupling member movably arranged on said conduit member and adapted to interlock with a mating coupler, and means for tightening said interlocking engagement comprising a yoke member pivoted to said coupling member to move longitudinally thereof and a wedge for exerting pressure against said yoke.

15. In a hose coupler, the combination with a conduit member, a coupling member movably arranged on said conduit member and adapted to interlock with a mating coupler, and means for tightening said interlocking engagement comprising a member engaging said conduit member and movable longitudinally of said coupling member, and a wedge adapted to be driven against said member.

16. In a hose coupler, the combination with a conduit member, a coupling member movably arranged on said conduit member and adapted to interlock with a mating coupler and means for tightening said interlocking engagement comprising a yoke embracing a coupling member and engaging said conduit member and movable longitudinally of said coupling member, and a wedge adapted to be driven against said member.

17. In a hose coupler, the combination with a conduit member, a coupling member movably arranged on said conduit member and adapted to interlock with a mating coupler and means for tightening said interlocking engagement comprising a yoke embracing the coupling member, a wedge adapted to be driven against said member, and a spring for holding said yoke in engagement with said wedge.

18. In a hose coupler, the combination with a conduit member formed with a pair of diametrically arranged outstanding projections, a coupling member through which the conduit member extends and which is slotted for said projections, means on the coupling member for interlocking the same with a mating coupler, a yoke member having rearwardly curved legs extending back of said projections, a spring for moving the yoke rearwardly, and a wedge adapted to be driven against the yoke to force it in a forward direction to tighten said interlocking engagement and to force the conduit member against the mating coupler.

EGBERT H. GOLD.
EDWARD A. RUSSELL.